Patented Dec. 2, 1941

2,264,320

UNITED STATES PATENT OFFICE 2,264,320

VITAMIN D₃ DOUBLE COMPOUNDS

Otto Linsert, Wuppertal-Elberfeld, Germany, assignor, by mesne assignments, to Alba Pharmaceutical Company, Inc., New York, N. Y., a corporation of New York No Drawing. Application June 22, 1939, Serial No. 280,581. In Germany July 11, 1938

3 Claims. (Cl. 260—397.2)

This invention relates to vitamin D₃ double compounds.

It is known that 7-dehydrocholesterol is converted into an antirachitically highly active transformation product by chemically active irradiation, particularly by ultraviolet irradiation. The transformation product which has been prepared in pure form has been called vitamin D₃. Brockmann (Zeitschrift für Physiologische Chemie 256, 1938, page 252) has proved that the vitamin D occurring in nature, for instance in halibut or tunny liver oils, is for the most part identical with the vitamin D₃.

The vitamin D₃, immaterial whether produced from natural sources or by irradiation of 7-dehydrocholesterol, shows the disadvantage that it is sensitive to oxygen. On storage without special precautions the vitamin D₃ in pure form as well as in preparations, for instance solutions or mixtures of inert ingredients, is changed and therefore the antirachitic efficacy is gradually decreased.

In accordance with the present invention it has been found that the vitamin D₃ forms double compounds with sterols of the group consisting of cholesterol, cholestanol, and coprosterol, and that the sensitiveness of the vitamin D₃ in the double compounds is considerably decreased. The vitamin D efficacy, is preserved and corresponds to the vitamin D₃ content. The greater stability of the double compounds allows a more convenient handling of vitamin D₃, so that a storage or use without special precautions is possible.

A further advantage of the new double compounds consists in that they show a good crystallizability. As the vitamin D₃ also in nearly pure form is difficult to crystallize, variable amounts and partly only very moderate yields of crystallized vitamin D₃ are obtained. When, however, a double compound with one of the above mentioned compounds is formed the vitamin D₃ is precipitated in nearly the theoretical yield in the crystallized state from solutions containing it.

The manufacture of the double compounds may be performed as follows:

To a solution of vitamin D₃, for instance in acetone, methanol, or alcohol, an equivalent amount of for instance cholesterol is added and the whole heated until the sterol is dissolved. On cooling—if necessary after adding some water—crystallization occurs. After standing for some hours the double compound is precipitated in nearly the quantitive yield and can be separated in usual way by filtering with suction and washing. Obviously it is immaterial whether a natural or synthetically prepared vitamin D₃ is employed. The vitamin D₃ double compounds are stable and may be recrystallized unchanged from suited solvents.

The following examples illustrate the invention without, however, restricting it thereto.

Example 1

15 g. of vitamin D₃ dinitrobenzoate are heated to boiling with 45 cc. of a 10 per cent methyl-alcoholic potassium lye for 10 minutes. After cooling the saponified solution is diluted with double the volume of water and the free vitamin D₃ extracted with ether. The ethereal extract is evaporated in vacuo after drying over sodium sulfate. The residue is dissolved in 150 cc. of acetone, mixed with 9.5 g. of cholesterol and heated to boiling until it dissolves. The still warm acetone solution is mixed with water until turbidity occurs. After standing for a short time precipitation of the double compound of vitamin D₃ with cholesterol begins. After about 5 hours the crystallisate is filtered off, washed with methanol and dried on the air. It represents fine needles of the melting point of 118–119°. The yield is 90–95 per cent of theory. The double compound shows a specific rotary power of $[\alpha]_D = +25.25°$ in acetone.

If instead of cholesterol cholestanol is used in the above example a double compound with similar properties is obtained having a melting point of 116° and showing a rotary power of $[\alpha] = +55.5°$ in acetone.

Example 2

35 g. of an irradiation product of 7-dehydrocholesterol—freed from unchanged starting material—are dissolved in 100 cc. of acetone, mixed with 12 g. of cholesterol and heated to boiling until the cholesterol is absolutely dissolved. On cooling the double compound of vitamin D₃ with cholesterol is precipitated in fine needles, which—if desired—may be purified by dissolving in hot acetone and adding water until the solution begins to turn cloudy. Melting point: 118–119° C.

I claim:

1. Vitamin D₃ double compounds with a sterol selected from the group consisting of cholesterol, cholestanol, and coprosterol.

2. The vitamin D₃ double compound with cholesterol crystallizing in thin needles, showing a melting point of 118–119° and the specific rotary power $[\alpha]_D = +25.5°$ in acetone.

3. The vitamin D₃ double compound with cholestanol melting at 116° and showing the specific rotary power $[\alpha]_D = +55.5°$ in acetone.

OTTO LINSERT.